July 13, 1954  R. J. KINNEY  2,683,461
CANE FOR USE BY THE BLIND
Filed April 22, 1950
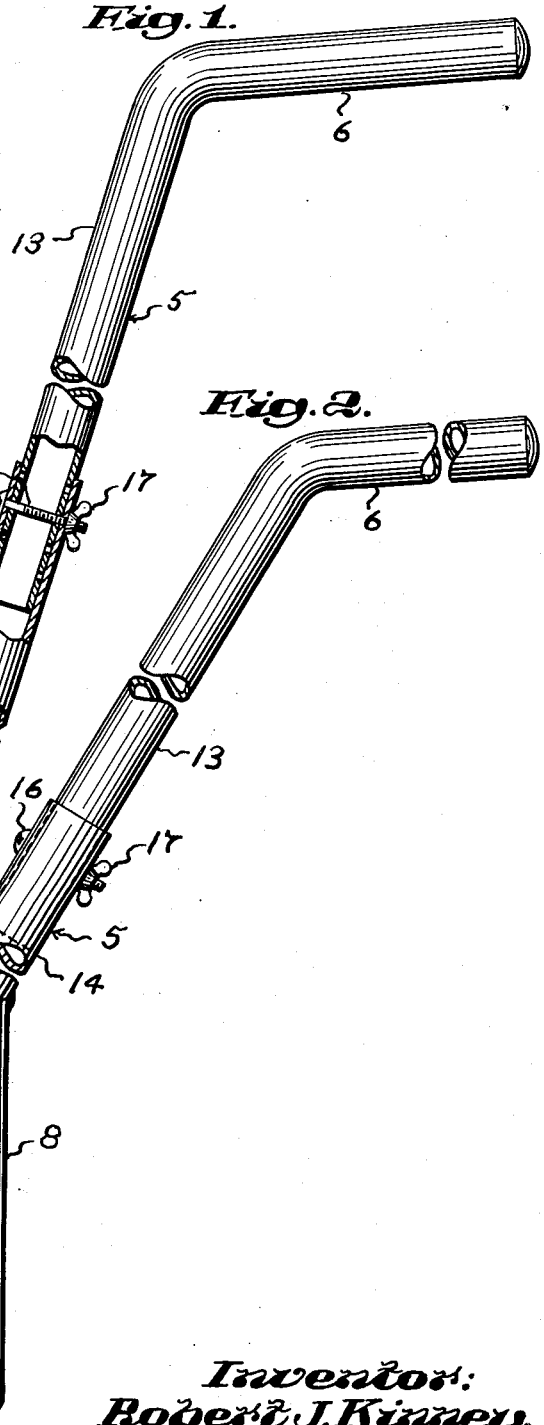
Inventor:
Robert J. Kinney,
by Abbott Spear
Attorney Patented July 13, 1954

2,683,461

UNITED STATES PATENT OFFICE 2,683,461

CANE FOR USE BY THE BLIND

Robert J. Kinney, Portland, Maine

Application April 22, 1950, Serial No. 157,538

5 Claims. (Cl. 135—45)

My present invention relates to canes for use by blind persons and has, for its particular objective, the provision of a cane that is adapted to serve as a brake to the user to warn him of a hole or like hazard in his path.

In accordance with my invention, I provide a cane consisting of a main member having a pair of legs at its lower end disposed at an angle to each other. The first of these legs carries a ground engaging wheel and the second leg is dimensioned so that when the cane is held by the user with the wheel in advance of his path and in engagement with the ground and the second leg in trailing relation to the to the first leg, the extremity of the second leg is spaced a substantial distance above the ground. The extremity of the second leg preferably has a tip of rubber or other suitable material.

When such a cane is held as above described, the user is protected against falls occasioned by stepping in holes or from curbstones since the wheel is in advance of his path and when it drops, the second leg of the cane engages the ground as a brake.

In the accompanying drawings, I have shown illustrative embodiments of my invention from which these and other of its novel features and advantages will be readily apparent.

Fig. 1 is a partly sectioned view, in elevation, of a cane in accordance with my invention.

Fig. 2 is a view, similar to Fig. 1, of another embodiment of my invention, and

Fig. 3 is a fragmentary front view of the cane shown in Fig. 1.

In the embodiments of my invention shown in the drawings, I have shown canes, each of which consists of a main member, generally indicated at 5, having a handle 6 at its upper end and a pair of legs 7 and 8 at its lower end disposed at an angle to each other but lying in a vertical plane inclusive of the handle 6.

The leg 7 has a fork 9 at its lower end through which extends the axle 10 for a ground engaging wheel 11. The leg 8 is dimensioned so that when the handle 6 of the cane is held by the user to position the wheel 11 in engagement with the ground in advance of his path, the leg 8 is in trailing relation to the leg 7 and its extremity is spaced appreciably above the ground. That extremity is preferably provided with a tip 12 of rubber or the like.

While the legs 7 and 8 are disposed at an angle to each other, the leg 8 may constitute an extension of the member 5 as shown in Fig. 1 and the leg 7 extend forwardly relative thereto or the leg 7 may itself be an extension of the member 5 and the leg 8 be rearwardly disposed relative thereto.

It is important that canes in accordance with my invention fit the user properly and for that reason the member 5 is extensible. While this may be variously effected, I have shown the member 5 as consisting of an upper section 13 and a lower section 14, both of tubular stock but with the lower end of the section 13 dimensioned to fit the socket established by the upper end of the section 14. As will be apparent from Fig. 1, the lower end of the section 13 has a series of transversely alined and vertically spaced pairs of apertures 15 any pair of which when in registry with a transverse pair of apertures in the socket enable the sections of the member 5 to be securely united by means of the inserted bolt 16 and the wing nut 17 threaded thereon.

From the foregoing, it will be apparent that canes in accordance with my invention are well suited to meet the needs of blind persons to minimize risk of injury to them as a result of stepping into holes, from curbstones, or like conditions hazardous for them for when the user of one of my canes has the wheel in engagement with the ground and in advance of his path, the second leg engages the ground and constitutes an effective brake when the wheel encounters such a dangerous condition. This results because of the fact that normally, substantially the full weight of the user's arm is supported by the cane since its wheel enables it to be advanced along the ground ahead of the user with a minimum of effort. As a consequence, when the extremity of the second leg strikes the ground, not only is forward progress of the cane braked but also there is exerted a positive back thrust through the cane holding arm against the body should the user not immediately stop.

What I therefore claim and desire to secure by Letters Patent is:

1. A cane for use by a blind person, said cane comprising a main member including an angularly disposed handle, and first and second legs at the lower end of said member disposed at an acute angle to each other but in a vertical plane inclusive of said handle, a ground engaging wheel carried by said first leg, said second leg being shorter than and positioned relative to said first leg so that when said cane is held by the user with said wheel in advance of the user and in engagement with the ground, said second leg is in trailing relation to said first leg, and its extremity is spaced substantially from the ground but engages therewith as a brake if said wheel drops over a curbstone or into a depression.

2. A cane for use by a blind person, said cane comprising a main member, a handle at the upper end of said member and first and second legs at the lower end of said member disposed at an acute angle to each other, but in a vertical plane inclusive of said handle, a ground engaging wheel carried by said first leg, a friction tip on said second leg, said second leg being shorter than and positioned relative to said first leg so that when said cane is held by the user with said wheel in advance of his path and in engagement with the ground and said second leg in trailing relation to said first leg, the extremity of said second leg is spaced substantially from the ground but engages therewith as a brake if said wheel drops over a curbstone or into a depression.

3. A cane for use by a blind person, said cane comprising a main member, and first leg constituting an extension of said member, a second leg extending rearwardly relative to said member said legs both being in a vertical plane inclusive of said member, a ground engaging wheel carried by said first leg, a friction tip on said second leg, said second leg being shorter than said first leg including its wheel and being positioned relative to said first leg so that when said cane is held by the user with said wheel in advance of the user and in engagement with the ground and said second leg in trailing relation to said first leg, said tip is spaced substantially from the ground but engages therewith as a brake if said wheel drops over a curbstone or into a depression.

4. A cane for use by a blind person, said cane comprising a main member, and first and second legs, said second leg constituting an extension of said member and said first leg extending forwardly at an acute angle relative to said member, said legs both being in a vertical plane inclusive of said members a ground engaging wheel carried by said first leg, a friction tip on said second leg, said second leg being shorter than and positioned relative to said first leg so that when said cane is held by the user with said wheel in advance of the user and in engagement with the ground and said second leg in trailing relation to said first leg, said tip is spaced substantially from the ground but engages therewith as a brake if said wheel drops over a curbstone or into a depression.

5. A cane for use by a blind person, said cane comprising a main member, a handle at the upper end of said member, and first and second legs at the lower end of said member disposed at an acute angle to each other but in a plane inclusive of said handle, a ground engaging wheel carried by said first leg, said second leg being shorter than and positioned relative to said first leg so that when said cane is held by the user with said wheel in advance of his path and in engagement with the ground, and said second leg is in trailing relation to said first leg, the extremity of said second leg is spaced substantially from the ground but engages therewith as a brake if said wheel drops over a curbstone or into a depression, and said member including upper and lower sections each of which is of tubular stock dimensioned so that one may fit within the other, and means to lock said sections together in any one of a plurality of telescoped positions thereby to enable the length of said member to be adjusted as required by the user.

References Cited in the file of this patent

UNITED STATES PATENTS

| Number | Name | Date |
|---|---|---|
| 1,177,582 | Murphy | Mar. 28, 1916 |
| 2,244,869 | Everest et al. | June 10, 1941 |

FOREIGN PATENTS

| Number | Country | Date |
|---|---|---|
| 116,977 | Australia | May 12, 1943 |